UNITED STATES PATENT OFFICE.

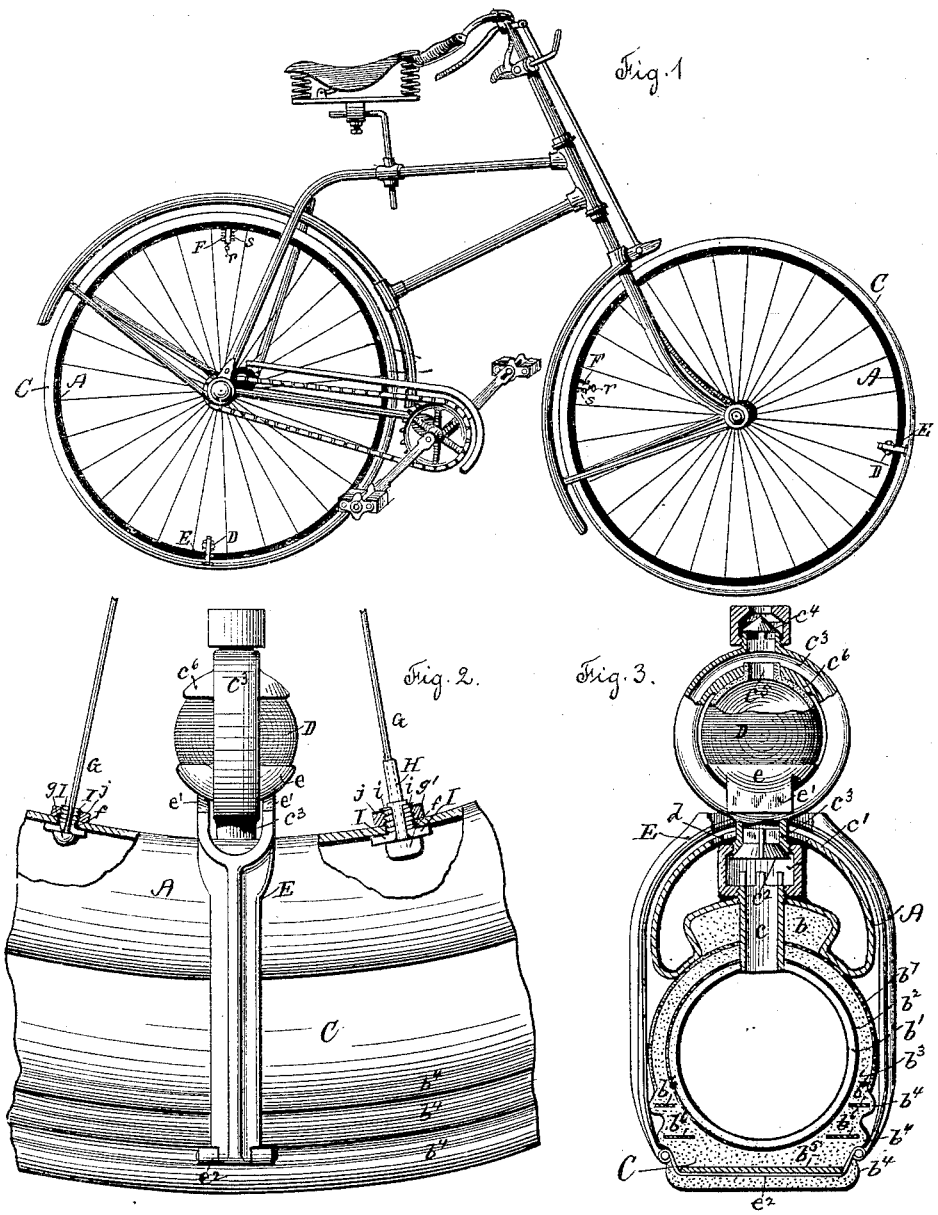

PARDON W. TILLINGHAST, OF PROVIDENCE, RHODE ISLAND.

BICYCLE.

SPECIFICATION forming part of Letters Patent No. 450,951, dated April 21, 1891.

Application filed November 3, 1890. Serial No. 370,245. (No model.)

*To all whom it may concern:*

Be it known that I, PARDON W. TILLINGHAST, a citizen of the United States, residing at Providence, in the State of Rhode Island, have invented a new and useful Improvement in Bicycles, of which the following is a specification.

My invention has for its object to provide an improved pneumatic tire for bicycles or similar vehicles, and also to provide for the convenient insertion and removal of the spokes of the wheel; and it consists in the improved construction of the tire, and in the combination therewith of an automatically-operated pump which will cause the proper inflation of the tire.

It also consists in the combination therewith of an automatic relief-valve, whereby the pressure of air in the tire can be regulated at will, and in the combination, with the rim of the wheel, of removable hooks which serve to reduce the opening around the spoke or the spoke-attaching nipple subsequent to the insertion of the same into the perforation in the rim of the wheel, as hereinafter fully set forth.

Figure 1 represents a side view of a bicycle embodying my improvements. Fig. 2 represents a side view of a portion of the wheel-rim and tire, showing the automatically-operated pump for forcing air into the hollow of the tire. Fig. 3 represents a cross-section taken through the tire and pump.

It is well-known that in ordinary bicycles great annoyance is caused the rider when going over a rough road on account of the constant jumping to which the machine is subjected when passing over obstructions—such as sticks or cobblestones—and the undue strain which is in this way brought upon the machine itself soon renders some of the delicate parts of the machine unfit for use, so that frequent repairs have to be made notwithstanding the fact that the tires of the wheels are made of soft rubber.

In the tires such as were commonly made heretofore it has been the chief aim to render the running of the machine almost noiseless, and as the rubber naturally possesses elasticity, a small amount of yielding effect was obtained, which, however, has proved insufficient to save the machine from injurious shock when passing over cobblestone pavements. This difficulty has now been successfully overcome by employing tubular tires which are filled with air, thus practically forming an air-cushion which will not be affected by the above-mentioned obstructions, since the tire can be thus made soft enough to pass over the obstructions without jarring the machine. It will be understood of course that in tires of this class the air must be retained under pressure to insure an inflation to the proper degree, and this has heretofore been done by sealing the opening through which the tire was charged. It has, however, been found in practice that it is impossible to prevent all leakage of the air from the tire, so that after a little while the air-pressure would become so reduced as to render necessary the recharging of the tire. To perform this duty with a hand-pump, as heretofore, entails a loss of time and labor, which it is the object of my invention to avoid; and, furthermore, the adjustability of the relief-valve enables the rider to regulate the pressure within the tire to conform to the condition of the road to be traversed—as for racing on the track the tire should be quite hard, while on rough roads the maximum degree of softness consistent with safety should be used.

In the accompanying drawings, A is the rim of the wheel, the inner portion of which is so constructed as to form an annular dovetail groove to receive a corresponding dovetail flange $b$ of the tire C, which is constructed substantially as follows: The inner tube $b'$ is made of a continuous hollow ring of rubber and covered with canvas $b^2$ or braided fabric, the whole being covered by a layer of rubber $b^3$, provided with the corrugations $b^4$, which serve to protect the sides of the tire from injury, and with the thin flexible metallic band $b^5$, of spring metal, which extends around the tire and is embedded therein, so as to be protected from oxidation and wear, and also with the supplementary metal bands $b^6$, so that the tread of the tire will be protected from injury by sharp or pointed objects, which are liable to cut or enter the inner tube containing the air, thus causing a leak, the surface corrugations $b^4$ serving to prevent injurious wear of the tire by projecting from the line of its general contour, whereby the tire can be made to have the required degree of lightness and flexibility with the proper protection from injurious contact and wear, and the rubber flange $b$ is attached to the layer of rubber $b^3$ by means of the strip of canvas $b^7$.

Projecting through the rubber flange $b$ and extending into the tube $b'$ is a pipe $c$, which is provided with a screw-thread near its top (see Fig. 3) to receive the valve-chamber $c'$, within which the valve $c^2$ is allowed to move toward and from its seat, which is formed at the lower end of the supply-pipe $c^3$. The said pipe passes through an opening $d$ in the rim A and is screwed into the top of the valve-chamber $c'$, and at the outside of the rim A the pipe $c^3$ is made in the form of a hollow ring, which is provided with the valve $c^4$, through which the air may pass into the pipe $c^3$.

Facing the opening from the valve $c^4$ into the pipe $c^3$ is the outlet-opening $c^5$ of the hollow elastic ball D, which is cemented into the cup $c^6$ of the supply-pipe $c^3$. (See Fig. 2.) It will be thus understood that when the ball D is compressed the rush of air through the outlet-opening $c^5$ will cause the valve $c^4$ to close, and the air will then be forced through the hollow ring, thereby opening the valve $c^2$, and thence through the pipe $c$ into the hollow tire C.

I will now describe the means for automatically compressing the pump-ball D to force the air into the hollow of the tire, reference being had to Figs. 2 and 3 of the drawings, in which $e$ is a cup placed against the ball D and provided with the downwardly-projecting ears $e'$, resting against the head of the yoke E, which consists of a strap or forked connection loosely straddling the rim and tire and having its ends attached to a transverse plate $e^2$, which is vulcanized into the outer tube or layer of rubber $b^3$. It will, therefore, be seen that when the tread of the tire B is compressed at this point, such condition occurring at each revolution of the wheel, the yoke E will be forced upward, and as the cup $e$ rests with its ears $e'$ upon the top of the yoke the said cup $e$ will be raised, resulting in a compression of the pump-ball D, and thus forcing air into the cavity of the tire, and it will be seen that by means of the independent connection or yoke E, which bears against the ears $e'$ of the cup $e$ of the pump suitable provision will be made for any lateral movement of the tread of the tire without causing injury to the operating parts of the pump.

Referring to Fig. 1, F represents an adjustable relief-valve of ordinary construction which will enable the rider to secure any desired degree of air-pressure in the tire by merely turning the regulating nut or screw $r$ in the proper direction, so that in case a surplus of air is forced into the tire at each stroke of the pump the said surplus will escape at the valve, which is held to its seat by a spring $s$.

In order to provide for the ready attachment and removal of the spokes of a bicycle or similar vehicle, I provide a perforation $f$ in the rim A of sufficient diameter to receive the head $g$ of the spoke G or the head $g'$ of an attaching screw-nipple H, and around the said spoke or nipple in the opening $f$ and subsequent to the insertion of the said heads within the cavity of the rim are inserted the bushing-hooks I, which are made in L form, and tend to reduce the opening $f$, so that the heads cannot be thereafter withdrawn without the removal of the said bushing-hooks, thus allowing the spoke to be screwed up as tightly as required, and in order to provide a desirable finished appearance and for holding the hooks snugly around the spoke or nipple I provide one arm $i$ of the hook with a screw-thread, which is adapted to enter the thread of the nut $j$, thus firmly holding the said hooks.

It is of course to be understood that I do not limit my invention to the employment of a ball-pump for forcing the air into the tire, as it is evident that pumps of other well-known construction can be advantageously used in a similar manner for this purpose.

I make no claim, broadly, in this application to the combination, with a yielding hollow tire, of an air-pump arranged to be automatically operated by motion derived from the inward displacement of the tire under pressure, as shown, described, and claimed in Letters Patent of the United States No. 442,948, dated December 16, 1890, but only to the special construction and arrangement herein shown and described.

I claim as my invention—

1. In combination, the hollow tire and a thin flexible band of spring metal embedded in the tire, the material of which covers the band on all sides and protects it against oxidation, the said band being of a width sufficient to extend on each side of the central tread-line and prevent accidental perforation of the tire, substantially as described.

2. The combination, with the wheel and the yielding hollow tire, of the air-pump arranged upon the rim of the wheel outside of the tire, and an outside connection extending from the pump to the yielding tread of the tire, whereby the inward displacement of the tread of the tire will serve to operate the pump to force air into the cavity of the tire, substantially as described.

3. The combination, with the wheel and the yielding hollow tire, of the air-pump arranged upon the rim of the wheel outside of the tire, and the forked connection extending from the air-pump at both sides of the rim and tire to the yielding tread, whereby the inward displacement of the tread under pressure will serve to operate the pump to force air into the cavity of the tire, substantially as described.

4. The combination, with the wheel and the yielding hollow tire, of the pump arranged upon the rim of the wheel outside of the tire, and the independent forked connection which bears against the pump and extends at both sides of the rim to the yielding tread of the tire, whereby suitable allowance will be made for the lateral yielding movement of the tread without interfering with the proper operation of the pump, substantially as described.

5. The combination, with the wheel, a yielding hollow tire, and an air-pump for automatically inflating the tire, of a relief-valve, whereby any excess of pressure in said tire will be prevented, substantially as described.

6. The combination, with the rim of the wheel provided with perforations for the attachment of spokes thereto, of the screw-threaded bushing-hooks adapted for insertion into the said perforations subsequent to the insertion of the spoke or its attaching-nipple, and the nut for clamping the opposite screw-threaded bushing-hooks, substantially as described.

PARDON W. TILLINGHAST.

Witnesses:
   JOHN S. LYNCH,
   SOCRATES SCHOLFIELD.